(12) United States Patent
    Honda (10) Patent No.: US 11,210,536 B2
(45) Date of Patent: Dec. 28, 2021

(54) MOVING OBJECT RECOGNITION SYSTEM, MOVING OBJECT RECOGNITION METHOD, AND PROGRAM

(71) Applicant: TOYOTA JIDOSHA KABUSHIKI KAISHA, Toyota (JP)

(72) Inventor: Daisaku Honda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/109,539

(22) Filed: Dec. 2, 2020

(65) Prior Publication Data

US 2021/0209382 A1   Jul. 8, 2021

(30) Foreign Application Priority Data

Jan. 6, 2020   (JP) .............................. JP2020-000311
Jul. 28, 2020  (JP) .............................. JP2020-127649

(51) Int. Cl.
    *G06K 9/00*    (2006.01)
    *G08G 1/16*    (2006.01)
    *B60Q 9/00*    (2006.01)

(52) U.S. Cl.
    CPC ........... *G06K 9/00805* (2013.01); *G08G 1/16* (2013.01); *G08G 1/166* (2013.01); *G08G 1/167* (2013.01);
    (Continued)

(58) Field of Classification Search
    CPC .......... G08G 1/01; G08G 1/0104; G08G 1/16; G08G 1/166; G08G 1/167; G06K 9/00624;
    (Continued)

(56) References Cited

U.S. PATENT DOCUMENTS 7,765,057 B2 *  7/2010  Taguchi ................. G08G 1/166
                                                      701/117
9,002,631 B2 *  4/2015  Taguchi .................. G01S 13/87
                                                      701/301
(Continued)

FOREIGN PATENT DOCUMENTS

JP      2017-173948 A    9/2017
JP      2018-195289 A   12/2018
WO      2010095437 A1    8/2010

OTHER PUBLICATIONS

NPLsearch.pdf. (Jul. 27, 2021).*

*Primary Examiner* — Van T Trieu
(74) *Attorney, Agent, or Firm* — Oliff PLC (57) ABSTRACT

A moving object recognition system includes: closed space entry/exit detection means for detecting moving objects entering a closed space and exiting the closed space, the closed space being formed of detection regions of a sensor configured to detect the moving objects and a blind spot region formed outside and between the detection regions; closed space total amount calculation means for calculating a closed space total amount based on the moving objects entering the closed space and exiting the closed space; region entry/exit detection means for detecting the moving objects entering the detection regions and the moving objects exiting the detection regions; and a blind spot total amount calculation means for calculating a blind spot total amount by subtracting the region total amount from the closed space total amount, the blind spot total amount being a total number of the moving objects present within the blind spot region.

7 Claims, 6 Drawing Sheets

(52) U.S. Cl.
CPC ........ *B60Q 9/008* (2013.01); *B60R 2300/105* (2013.01); *B60R 2300/802* (2013.01)

(58) Field of Classification Search
CPC ........... G06K 9/00664; G06K 9/00771; G06K 9/00791; G06K 9/00798; G06K 9/00805; B60R 21/00; B60R 2021/003
See application file for complete search history.

(56) References Cited

U.S. PATENT DOCUMENTS

| | | | |
|---|---|---|---|
| 10,453,344 B2 * | 10/2019 | Ishii | G08G 1/167 |
| 10,497,265 B2 * | 12/2019 | Ohnishi | G08G 1/04 |
| 2011/0029278 A1 | 2/2011 | Tanigawa | |
| 2017/0147885 A1 | 5/2017 | Aggarwal et al. | |
| 2017/0276780 A1 | 9/2017 | Takehara et al. | |
| 2018/0336787 A1 | 11/2018 | Ohnishi et al. | |
| 2019/0257978 A1 | 8/2019 | Nakamura et al. | |

* cited by examiner

MOVING OBJECT RECOGNITION SYSTEM, MOVING OBJECT RECOGNITION METHOD, AND PROGRAM

CROSS REFERENCE TO RELATED APPLICATIONS

This application is based upon and claims the benefit of priority from Japanese patent application No. 2020-000311, filed on Jan. 6, 2020 and Japanese patent application No. 2020-127649, filed on Jul. 28, 2020, the disclosures of which are incorporated herein in their entireties by reference.

BACKGROUND

The present disclosure relates to a moving object recognition system that recognizes a moving object, a moving object recognition method, and a program.

A moving object recognition system that recognizes a moving object present within a blind spot of a sensor of a vehicle based on location information of a communication device acquired through infrastructure communication such as inter-vehicle communication and location information of the moving object detected by the sensor of the vehicle is known (see, for example, Japanese Patent Application Publication No. 2017-173948).

SUMMARY

However, in the aforementioned moving object recognition system, when, for example, the communication device is not mounted on the moving object, the location information of the communication device cannot be acquired and there is thus a possibility that the moving object present within a blind spot cannot be recognized.

The present disclosure has been made in order to solve the aforementioned problem and an object thereof is to provide a moving object recognition system capable of recognizing a moving object present within a blind spot, a moving object recognition method, and a program.

An exemplary aspect for attaining the aforementioned object is a moving object recognition system including:

a closed space entry/exit detection means for detecting a moving object entering a closed space and a moving object exiting the closed space, the closed space being formed of detection regions of a sensor configured to detect the moving objects and a blind spot region formed outside and between the detection regions;

a closed space total amount calculation means for calculating a closed space total amount based on the moving objects entering the closed space and the moving objects exiting the closed space detected by the closed space entry/exit detection means, the closed space total amount being a total number of the moving objects present within the closed space;

a region entry/exit detection means for detecting the moving objects entering the detection regions and the moving objects exiting the detection regions;

a region total amount calculation means for calculating a region total amount based on the moving objects entering the detection regions and the moving objects exiting the detection regions detected by the region entry/exit detection means, the region total amount being a total number of the moving objects present within the detection regions; and a blind spot total amount calculation means for calculating a blind spot total amount by subtracting the region total amount calculated by the region total amount calculation means from the closed space total amount calculated by the closed space total amount calculation means, the blind spot total amount being a total number of the moving objects present within the blind spot region.

According to this aspect, an entrance of a building is located within the blind spot region and a person detection means for detecting a person entering the blind spot region from the entrance and a person exiting the blind spot region from the entrance is disposed to the entrance. The blind spot total amount calculation means may calculate the final blind spot total amount by adding the number of persons who have entered the blind spot region and subtracting the number person who have exited the blind spot region detected by the person detection means to and from the result of calculation obtained by subtracting the region total amount calculated by the region total amount calculation means from the closed space total amount calculated by the closed space total amount calculation means.

According to this aspect, the blind spot total amount calculation means may be configured to calculate the final blind spot total amount by estimating the number of persons getting in and out of the vehicle present within the blind spot region and adding the estimated number of persons getting out of the vehicle and subtracting the estimated number of persons getting in the vehicle to and from the result of calculation obtained by subtracting the region total amount calculated by the region total amount calculation means from the closed space total amount calculated by the closed space total amount calculation means.

According to this aspect, a notification means may be further provided for notifying each moving object entering the detection regions of the region total amount of each of the detection regions and each moving object entering the blind spot region of the blind spot total amount of the blind spot region.

Another exemplary aspect for attaining the aforementioned object may be a moving object recognition method including the steps of:

detecting a moving object entering a closed space and a moving object exiting the closed space, the closed space being formed of detection regions of a sensor configured to detect the moving objects and a blind spot region formed outside and between the detection regions;

calculating a closed space total amount based on the moving objects entering the closed space and the moving objects exiting the closed space detected in the step of detecting the moving object entering the closed space and the moving object exiting the closed space, the closed space total amount being a total number of the moving objects present within the closed space;

detecting the moving objects entering the detection regions and the moving objects exiting the detection regions;

calculating a region total amount based on the moving objects entering the detection regions and the moving objects exiting the detection regions detected in the step of detecting the moving objects entering the detection regions and the moving objects exiting the detection regions, the region total amount being a total number of the moving objects present within the detection regions; and calculating a blind spot total amount by subtracting the calculated region total amount from the calculated closed space total amount, the blind spot total amount being a total number of the moving objects present within the blind spot region.

Another exemplary aspect for attaining the aforementioned object may be a program for causing a computer to perform the processes of:

detecting a moving object entering a closed space and a moving object exiting the closed space, the closed space being formed of detection regions of a sensor configured to detect the moving objects and a blind spot region formed outside and between the detection regions;

calculating a closed space total amount based on the moving objects entering the closed space and the moving objects exiting the closed space detected in the process of detecting the moving object entering the closed space and the moving object exiting the closed space, the closed space total amount being a total number of the moving objects present within the closed space;

detecting the moving objects entering the detection regions and the moving objects exiting the detection regions;

calculating a region total amount based on the moving objects entering the detection regions and the moving objects exiting the detection regions detected in the process of detecting the moving objects entering the detection regions and the moving objects exiting the detection regions, the region total amount being a total number of the moving objects present within the detection regions; and calculating a blind spot total amount by subtracting the calculated region total amount from the calculated closed space total amount, the blind spot total amount being a total number of the moving objects present within the blind spot region.

According to the present disclosure, a moving object recognition system capable of recognizing a moving object present within a blind spot, a moving object recognition method, and a program can be provided.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiments of the present disclosure are described with reference to the drawings. A sensor installed in an infrastructure for the purpose of reducing occurrence of traffic accidents is desirably installed at an intersection such that there is no blind spot under any installation conditions and traffic status. However, due to the restriction in the installation site and the cost for the installation, it is practically impossible to install the sensor such that there is no blind spot.

With a moving object recognition system according to an embodiment of the present disclosure, even when the sensor has a blind spot as described above, safety of a moving object can be enhanced by recognizing the moving object present within the blind spot.

Figure 1:
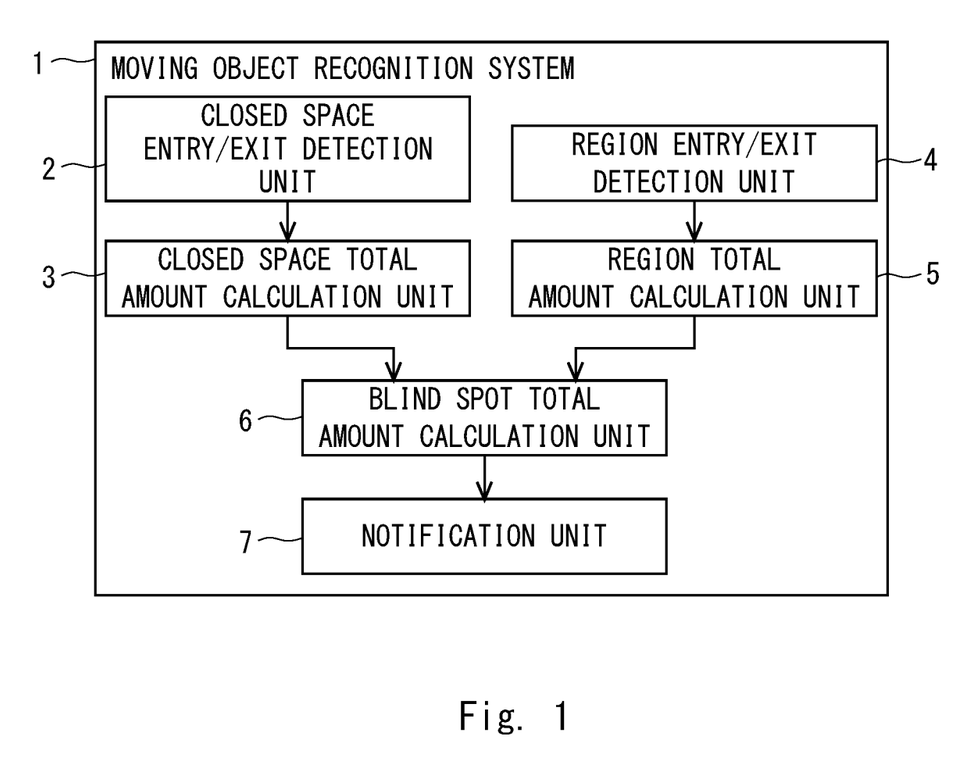
FIG. 1 is a block diagram showing a schematic system showing a configuration of a moving object recognition system according to an embodiment of the present disclosure.

FIG. 1 is a block diagram showing a schematic system configuration of a moving object recognition system according to the present embodiment. A moving object recognition system 1 according to the present embodiment includes a closed space entry/exit detection unit 2 that detects a moving object entering a closed space and a moving object exiting the closed space, a closed space total amount calculation unit 3 that calculates a total number of the moving objects present within the closed space (hereinafter also referred to as a closed space total amount), a region entry/exit detection unit 4 that detects moving objects entering detection regions of the sensor and moving objects exiting the detection regions of the sensor, a region total amount calculation unit 5 that calculates a total number of the moving objects present within the regions (hereinafter also referred to as a region total amount), a blind spot total amount calculation unit 6 that calculates a total number of the moving objects present within the blind spot region (hereinafter also referred to as a blind spot total amount), and a notification unit 7 that performs notification of the blind spot total amount.

Note that the moving object recognition system 1 has a hardware configuration configured of a microcomputer at the center thereof, the microcomputer including a central processing unit (CPU) for performing calculation processing, a memory configured of a read only memory (ROM) and a random access memory (RAM) that store a calculation program and the like to be executed by the CPU, and an interface unit (I/F) that performs input and output of a signal to and from the outside. The CPU, the memory, and the interface unit are connected with one another through a data bus.

The closed space entry/exit detection unit 2 is a specific example of a closed space entry/exit detection means. The closed space is formed of the detection region of the sensor for detecting the moving object and the blind spot region of the sensor. The moving object is a dynamic object such as a human being, an animal, and an automobile. The sensor is a distance sensor such as an ultrasonic sensor, a laser sensor, and a camera. The detection region of the sensor is a region where the sensor can detect an object in the closed space. On the other hand, the blind spot region of the sensor is outside the detection region of the sensor in the closed space and is a region where the object cannot be detected by the sensor installed between the detection regions.

Figure 2:
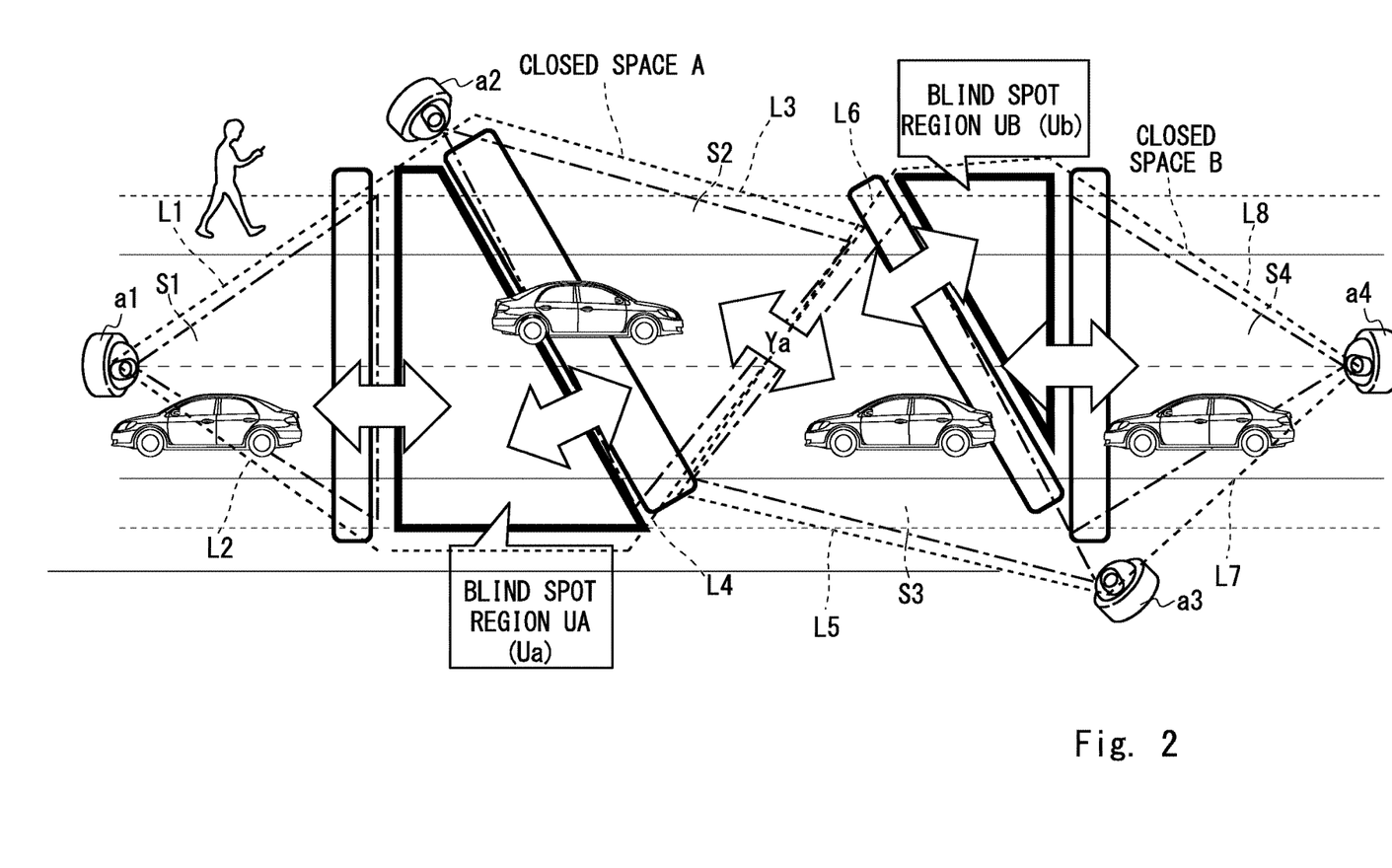
FIG. 2 is a diagram showing an example of a closed space formed at any given section of a straight road.

For example, as shown in FIG. 2, a closed space A is formed of a detection region S1 of a sensor a1, a detection region S2 of a sensor a2, and a blind spot region UA of the sensors a1 and a2 formed between the sensors a1 and a2 and outside the detection regions of the sensors a1 and a2 at any given section of a straight road. A closed space B is formed of a detection region S3 of a sensor a3, a detection region S4 of a sensor a4, and a blind spot region UB of the sensors a3 and a4 formed between the sensors a3 and a4 at any given section of a straight road.

In FIG. 2, two closed regions A and B are formed on the road, however it is not limited thereto. For example, one closed region or three or more closed regions may be formed on the road. The closed space A and the closed space B are formed in a continuous manner, however it is not limited thereto. The closed space may be formed intermittently on the road.

The two sensors a1 and a2 are installed at the closed region A and the two sensors a3 and a4 are installed at the closed region B, however it is not limited thereto. Three or more sensors may be installed at each of the closed regions A and B, and the number of the sensors installed at each of the closed regions A and B may be any arbitrary number. Further, the number of the sensors installed at the closed region A and that at the closed region B are the same, however they may be different from each other.

The closed space entry/exit detection unit 2 can detect the moving objects entering the closed space A and the moving objects exiting the closed space A based on the distance information output from the sensors a1 and a2. For example, the closed space entry/exit detection unit 2 detects the moving objects entering the closed space A from sides L1 and L2 that define the outline of the closed space A based on the distance information output from the sensor a1. The closed space entry/exit detection unit 2 detects the moving objects exiting the closed space A from the sides L1 and L2 that define the outline of the closed space A based on the distance information output from the sensor a1. Further, the closed space entry/exit detection unit 2 detects the moving objects entering the closed space A from sides L3 and L4 that define the outline of the closed space A based on the distance information output from the sensor a2. The closed space entry/exit detection unit 2 detects the moving objects exiting the closed space A from the sides L3 and L4 of the closed space A based on the distance information output from the sensor a2.

In the similar manner, the closed space entry/exit detection unit 2 can detect entry of the moving objects into the closed space B and exit of the moving objects out of the closed space B based on the distance information output from the sensors a3 and a4. For example, the closed space entry/exit detection unit 2 detects the moving objects entering the closed space B from sides L5 and L6 that define the outline of the closed space B based on the distance information output from the sensor a3. The closed space entry/exit detection unit 2 detects the moving objects exiting the closed space B from the sides L5 and L6 of the closed space B based on the distance information output from the sensor a3. Further, the closed space entry/exit detection unit 2 detects the moving objects entering the closed space B from sides L7 and L8 that define the outline of the closed space B based on the distance information output from the sensor a4. The closed space entry/exit detection unit 2 detects the moving objects exiting the closed space B from the sides L7 and L8 of the closed space B based on the distance information output from the sensor a4.

The closed space entry/exit detection unit 2 outputs the result of entry of the moving objects into the closed space and exit of the moving objects out of the closed space to the closed space total amount calculation unit 3.

The closed space total amount calculation unit 3 is a specific example of a closed space total amount calculation means. The closed space total amount calculation unit 3 calculates the closed space total amount which is a total number of the moving objects present within the closed space. The closed space total amount calculation unit 3 calculates the closed space total amount, which is a total number of the moving objects present within the closed space, based on the result of entry of the moving objects into the closed space and exit of the moving objects out of the closed space output from the closed space entry/exit detection unit 2.

The closed space total amount calculation unit 3 calculates the closed space total amount indicating the total number of the moving objects present within the closed space by the counter counting up the number of the moving objects entering the closed space and counting down the counter by the number of the moving objects exiting the closed space based on the result of entry of the moving objects into the closed space and exit of the moving objects out of the closed space output from the closed space entry/exit detection unit 2. Note that the counter may be set to 0 in its initial setting, or can be changed to an arbitrary value by a user.

For example, when the number of the moving objects entering the closed space A is 25 and the number of the moving objects exiting the closed space A is 20, the closed space total amount calculation unit 3 counts up the counter by 25 and further counts down the counter by 20 to thereby calculate the closed space total number of the moving objects present within the closed space A to be 5. The closed space total amount calculation unit 3 outputs the total number of the moving objects present within the closed space to the blind spot total amount calculation unit 6.

The region entry/exit detection unit 4 is a specific example of a region entry/exit detection means. The region entry/detection unit 4 detects the moving objects entering the detection regions and the moving objects exiting the detection regions. For example, as shown in FIG. 2, the region entry/exit detection unit 4 detects the moving objects entering the detection region S1 and the moving objects exiting the detection region S1 based on the distance information output from the sensor a1. The region entry/exit detection unit 4 detects the moving objects entering the detection region S2 and the moving objects exiting the detection region S2 based on the distance information output from the sensor a2. The region entry/exit detection unit 4 detects the moving objects entering the detection regions S3 and the moving objects exiting the detection region S3 based on the distance information output from the sensor a3. The region entry/exit detection unit 4 detects the moving objects entering the detection region S4 and the moving objects exiting the detection regions based on the distance information output from the sensor a4. The region entry/detection unit 4 outputs the result of detection of the moving objects entering the detection regions and the moving objects exiting out of the detection regions to the region total amount calculation unit 5.

The region total amount calculation unit 5 is a specific example of a region total amount calculation means. The region total amount calculation unit 5 calculates the region total amount which is the number of the moving objects present within every detection region within the closed space. The region total amount calculation unit 5 calculates the number of the moving objects present within each detection region of the closed space and adds together the calculated numbers of the moving objects present within the detection regions to thereby calculate the region total amount.

The region total amount calculation unit 5 calculates the closed space total amount indicating the total number of the moving objects present within the closed space by the counter counting up by the number of the moving objects entering the closed space and by the counter counting down the number of the moving objects exiting the closed space based on the result of entry of the moving objects into the closed space and exit of the moving objects out of the closed space output from the region entry/exit detection unit 4. Note that the counter can be set at 0 in its initial setting, or can be changed to an arbitrary value by a user.

For example, the region total amount calculation unit 5 calculates the number of the moving objects present within the detection region S1 based on the result output from the region entry/exit detection unit 4 of entry of the moving objects into the detection region S1 of the closed space A and exit of the moving objects out of the detection region S1 of the closed space A. In the similar manner, the region total amount detection unit 5 calculates the number of the moving objects present within the detection region S2 based on the result output from the region entry/exit detection unit 4 of entry of the moving objects into the detection region S2 of the closed space A and exit of the moving objects out of the detection region S2 of the closed space A. Then, the region total amount calculation unit 5 adds together the calculated number of the moving objects present within the detection region S1 and the calculated number of the moving objects present within the detection region S2 to thereby calculate the region total number of the moving objects present within the closed space A.

In the similar manner, the region total amount calculation unit 5 calculates the number of the moving objects present within the detection region S3 based on the result output from the region entry/exit detection unit 4 of entry of the moving objects into the detection region S3 of the closed space B and exit of the moving objects out of the detection region S3 of the closed space B. The region total amount calculation unit 5 calculates the number of the moving objects present within the detection region S4 based on the result output from the region entry/exit detection unit 4 of entry of the moving objects into the detection region S4 of the closed space B and exit of the moving objects out of the detection region S4 of the closed space B. Then, the region total amount calculation unit 5 adds together the calculated number of the moving objects present within the detection region S3 and the calculated number of the moving objects present within the detection region S4 to thereby calculate the region total number of the moving objects present within the closed space B. The region total amount calculation unit 5 outputs the calculated region total number of the moving objects present within the closed space to the blind spot total amount calculation unit 6.

The blind spot total amount calculation unit 6 is a specific example of a blind spot total amount calculation means. The blind spot total amount calculation unit 6 calculates the blind spot total amount which is a total number of the moving objects present within the blind spot region of the closed space. The blind spot total amount calculation unit 6 calculates the blind spot total amount by subtracting the region total amount calculated by the region total amount calculation unit 5 from the closed space total amount calculated by the closed space total amount calculation unit 3.

For example, as shown in FIG. 2, the blind spot total amount calculation unit 6 calculates the blind spot total amount Ua (Ua=Sa−Xa) in the blind spot region UA of the closed space A by subtracting the region total amount Xa calculated by the region total amount calculation unit 5 from the closed space total amount Sa calculated by the closed space total amount calculation unit 3.

The blind spot total amount calculation unit 6 calculates the blind spot total amount Ub (Ub=Sb−Xb) in the blind spot region UB of the closed space B by subtracting the region total amount Xb calculated by the region total amount calculation unit 5 from the closed space total amount Sb calculated by the closed space total amount calculation unit 3.

The blind spot total amount calculation unit 6 may perform consistency processing such as resetting the counted number based on the elapsed time when it is determined that there is an inconsistency in the counted number calculated by the closed space total amount calculation unit 3 or the counted number calculated by the region total amount calculation unit 5. With this configuration, the blind spot total amount can be calculated with high precision.

For example, the total number of the moving objects present within the whole closed space, which is the combination of the closed spaces A and B, is referred to as T. The closed space entry/exit detection unit 2 detects the moving objects entering and exiting the whole closed space from the sides L1 and L2 that define the whole closed space based on the distance information output from the sensor a1. The closed space entry/exit detection unit 2 detects the moving objects entering and exiting the whole closed space from the sides L7 and L8 that define the whole closed space based on the distance information output from the sensor a4. The closed space total amount calculation unit 3 calculates the total number T of the moving objects present within the whole closed space by the counter counting up by the number of the moving objects entering the whole closed space and the counter counting down by the number of the moving objects exiting the whole closed space based on the result output from the closed space entry/exit detection unit 2 of entry of the moving objects into the closed space and exit of the moving objects out of the closed space.

If the aforementioned counted number is accurate, the total number T of the moving objects present within the whole closed space is equal to the sum of the closed space total amount Sa, which is the total number of the moving objects present within the closed space A, and the closed space total amount Sb, which is the total number of the moving objects present within the closed space B. That is, T=Sa+Sb holds true. Therefore, the blind spot total amount calculation unit 6 can determine that there is inconsistency in the aforementioned counted number when T=Sa+Sb does not hold true.

Further, when the aforementioned counted number is accurate, the total amount T of the moving objects present within the whole closed space is equal to the sum of the region total amount Xa and the blind spot total amount Ua of the closed space A and the region total amount Xb and the blind spot total amount Ub of the closed space B. That is, T=Xa+Ua+Xb+Ub holds true. Therefore, the blind spot total amount calculation unit 6 can determine that there is inconsistency in the aforementioned counted number when T=Xa+Ua+Xb+Ub does not hold true.

When it is determined that there is an inconsistency in the counted number as described above, the blind spot total amount calculation unit 6 may perform consistency processing of the counted number after elapse of prescribed time from the time of the determination. The prescribed time is set in advance in the blind spot total amount calculation unit 6 and other units. The blind spot total amount calculation unit 6 performs the consistency processing for correcting the count value of the counter of the closed space total amount calculation unit 3 or the region total amount calculation unit 5 so that T=Sa+Sb or T=Xa+Ua+Xb+Ub holds true. The blind spot total amount calculation unit 6 outputs the calculated blind spot total amount to the notification unit 7.

The notification unit 7 may notify each moving object of the region total amount of each detection region and the blind spot total amount of each blind spot region. For example, the notification unit 7 notifies the moving objects entering the detection regions S1 and S2 of the region total amount of the detection regions S1 and S2, respectively, and each moving object entering the blind spot region UA of the blind spot total amount of the blind spot region UA. The notification unit 7 performs notification by outputting a voice from a speaker or causing a display unit of the moving object to display the region total amount and the blind spot total amount. By this configuration, the user can recognize the total number of the moving objects present within each detection region and each blind spot region whereby safety can be improved.

Figure 3:
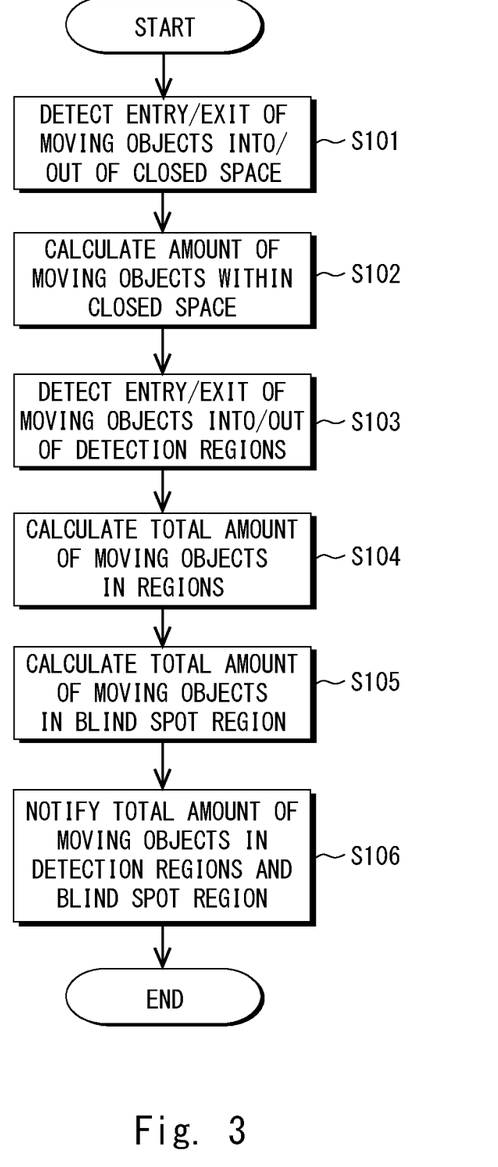
FIG. 3 is a flowchart showing a flow of processes performed in a moving object recognition method according to an embodiment of the present disclosure.

Next, a flow of processes performed in a moving object recognition method according to an embodiment of the present disclosure is explained in detail. FIG. 3 is a flowchart showing a flow of processes performed in a moving object recognition method according to the present embodiment.

The closed space entry/exit detection unit 2 detects the moving object entering the closed space and the moving object exiting the closed space based on the distance information output from the sensor and outputs the result of detection of the moving objects entering the closed space and the moving objects exiting the closed space to the closed space total amount calculation unit 3 (Step S101).

The closed space total amount calculation unit 3 calculates the closed space total amount based on the result output from the closed space entry/exit detection unit 2 of entry of the moving objects into the closed space and exit of the moving objects out of the closed space and outputs the calculated closed space total amount to the blind spot total amount calculation unit 6 (Step S102).

The region entry/exit detection unit 4 detects entry of the moving objects into the detection regions and exit of the moving objects out of the detection regions based on the distance information output from the sensor and outputs the result of detection of entry of the moving objects into the detection regions and exit of the moving object out of the detection regions to the region total amount calculation unit 5 (Step S103).

The region total amount calculation unit 5 calculates the region total amount based on the result output from the region entry/exit detection unit 4 of entry of the moving objects into the detection regions and exit of the moving objects out of the detection regions and outputs the calculated total number of the moving objects present within the regions to the blind spot total amount calculation unit 6 (Step S104).

The blind spot total amount calculation unit 6 calculates the blind spot total amount by subtracting the region total amount calculated by the region total amount calculation unit 5 from the closed space total amount calculated by the closed space total amount calculation unit 3, and outputs the calculated blind spot total amount to the notification unit 7 (Step S105).

The notification unit 7 notifies each moving object entering the detection regions of the total number of the moving objects present within the detection regions and each moving object entering the blind spot region of the total number of the moving objects present within the blind spot region (Step S106).

As described above, the moving object recognition system 1 according to the present embodiment includes the closed space entry/exit detection unit 2 that detects the moving objects entering the closed space and the moving objects exiting the closed space, the closed space total amount calculation unit 3 that calculates the total number of the moving objects present within the closed space, the region entry/exit detection unit 4 that detects the moving objects entering the detection regions and the moving objects exiting the detection regions, the region total amount calculation unit 5 that calculates the total number of the moving objects present within the detection regions, and the blind spot total amount calculation unit 6 that calculates the total number of the moving objects present within the blind spot region by subtracting the region total amount from the closed space total amount. With this configuration, the blind spot total number of the moving objects present within the blind spot region is calculated to thereby recognize the moving objects present within the blind spot.

Several embodiments of the present disclosure have been described as examples, and they are not intended to limit the scope of the disclosure. These noble embodiments can be implemented in various other forms and can be omitted, replaced, or changed variously without departing from the spirit and scope of the invention. These embodiments and modifications thereof are included in the scope and spirit of the present invention as well as in the scope of claims of the invention and its equivalents.

Figure 4:
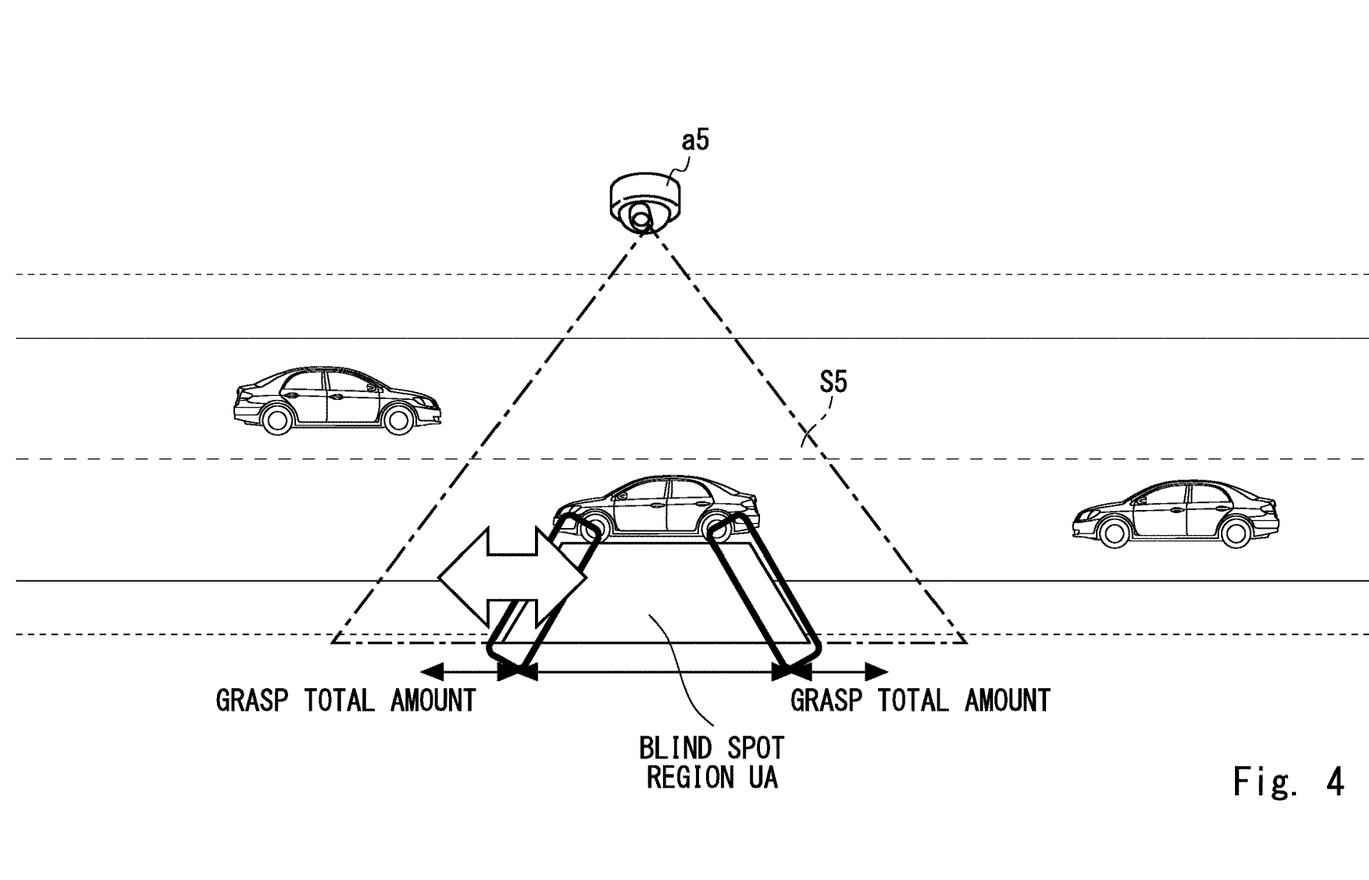
FIG. 4 is a diagram showing an example of a closed space formed within a detection region of a single sensor.

In the embodiments described above, as shown in FIG. 4, the blind spot region UA may be formed within the detection region S5 of a single sensor a5. For example, a case where the blind spot region UA is formed in a shadow of a moving object such as an automobile when viewed from the sensor a5 can be assumed. The closed region C is defined by a periphery of the detection region S5, and a periphery of the closed region C coincides with the periphery of the detection region S5. In this case, as regards the number of the moving objects present within the blind spot region UA, Uc=Sc−Xc holds true, wherein Uc is the blind spot total amount, Sc is the closed space total amount, and Xc is the region total amount.

Figure 5:
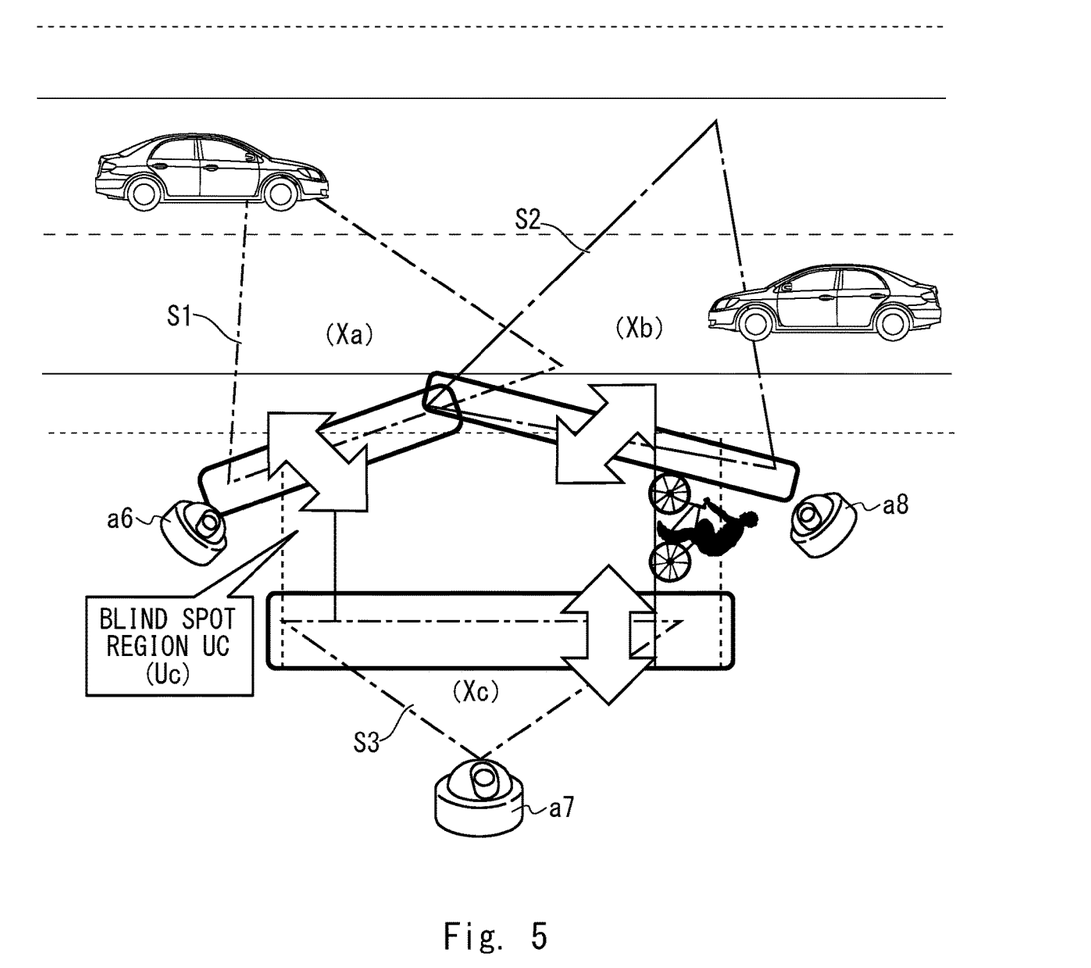
FIG. 5 is a diagram showing an example of a closed space formed at an intersection.

In the embodiments described above, as shown in FIG. 5, a closed space may be formed at an intersection. The closed space is defined by the detection regions S1, S2, and S3 of three sensors a6, a7, and a8, respectively, and the blind spot region UC. The blind spot region UC is a region surrounded by the detection regions S1, S2 and S3 and formed outside the detection regions S1, S2, and S3. The blind spot total amount Uc of the moving objects present within the blind spot region UC of the closed space can be calculated from the following expression:

$$Uc = \text{Closed space total amount} - \text{Region total amount}$$
(the number $Xa$ of moving objects present within the detection region $S1$ + the number $Xb$ of moving objects present within the detection region $S2$ + the number $Xc$ of moving objects present within the detection region $S3$)

Figure 6:
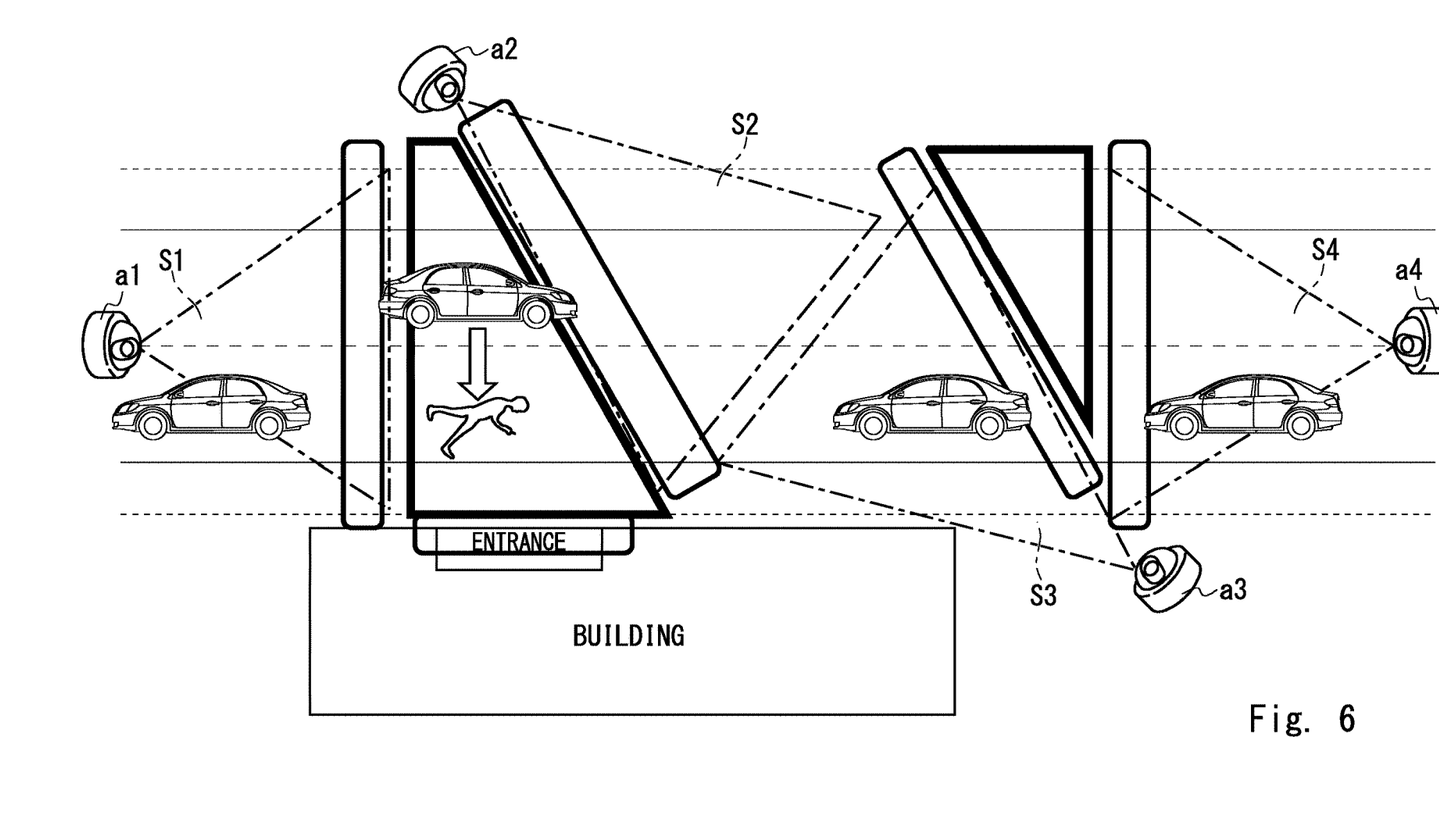
FIG. 6 is a diagram showing an example of a case where an entrance of a building is located within a blind spot region and a person gets in or out of a vehicle present within the blind spot region.

In the embodiments described above, the number of the moving objects increase or decrease in the blind spot region. For example, as shown in FIG. 6, there are cases where an entrance of a building is located within the blind spot region or a person gets in or out of a vehicle present within the blind spot region. In this case, there is an increase or decrease in the number of the moving objects such as a human being in the blind spot region.

When the entrance of the building is located within the blind spot region, a sensor for detecting a person entering the blind spot region from the entrance (i.e., a person entering) and a person exiting the blind spot region from the entrance (i.e., a person exiting) may be installed. The sensor is a specific example of a human detection means. The sensor is configured of a camera and other components.

The blind spot total amount calculation unit 6 adds and subtracts the number of persons entering and exiting the blind spot region detected by the sensor to and from the aforementioned calculated blind spot total amount to thereby calculate the final blind spot total amount. A plurality of entrances/exits may be located within the blind spot region. In this case, the blind spot total amount calculation unit 6 adds and subtracts the number of persons entering and exiting the blind spot region detected by the sensor of each entrance to and from the aforementioned calculated blind spot total amount to thereby calculate the final blind spot total amount. With this configuration, the blind spot total amount (i.e., the total number of the moving objects present within the blind spot region) can be calculated with high precision taking into consideration the number of persons entering and exiting the building from the entrance of the building located within the blind spot region.

The blind spot total amount calculation unit 6 may calculate the final blind spot total amount taking into consideration the number of persons getting in the vehicle and the number of persons getting out of the vehicle within the blind spot region. For example, the blind spot total amount calculation unit 6 estimates the number of persons getting out of the vehicle within the blind spot region (the number of persons alighting) and the number of persons getting in the vehicle (the number of persons riding).

For example, the blind spot total amount calculation unit 6 recognizes the number of persons in the vehicle based on an image of the vehicle entering the blind spot region captured by a camera. Further, the blind spot total amount calculation unit 6 recognizes the number of persons in the vehicle based on an image of the vehicle exiting the blind spot region captured by a camera. Then, the blind spot total amount calculation unit 6 can estimate the number of persons getting in and out of the vehicle from the increase and the decrease in the number of persons in the vehicle during a period from entry of the vehicle into the blind spot region to exit of the vehicle out of the blind spot region.

The blind spot total amount calculation unit 6 adds the estimated number of persons getting out of the vehicle and subtracts the estimated number of persons getting in the vehicle to and from the aforementioned calculated blind spot total amount to thereby calculate the final blind spot total amount. With this configuration, the blind spot total amount of the moving objects (i.e., the total number of the moving objects present within the blind spot region) can be calculated with high precision taking into consideration the number of persons getting in the vehicle and the number of person getting out of the vehicle within the blind spot region.

When a person gets in and/or out of a vehicle present within the blind spot region, the blind spot total amount calculation unit 6 may predict stoppage of the vehicle based on speed information of the vehicle to thereby predict that a person is to get in and/or out of the vehicle. The blind spot total amount calculation unit 6 calculates the final blind spot total amount taking into consideration the predicted increase and decrease in the number of the persons getting in and out of the vehicle in addition to the calculated blind spot total amount.

When stoppage of the vehicle is predicted, the blind spot total amount calculation unit 6 may perform resetting by raising the degree of likelihood of presence of a person in the blind spot region to a certain degree and lowering the degree in a time variant manner when no one gets in the vehicle in the blind spot region within a certain time period.

In the present disclosure, the processes shown in FIG. 3 can be implemented by causing a CPU execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The parts that configure the moving object recognition system 1 according to the embodiments described above cannot only be implemented by the program, and a part or all of the parts that configure the moving object recognition system 1 can be implemented by an exclusive hardware configuration such as Application Specific Integrated Circuit (ASIC) or Field-Programmable Gate Array (FPGA).

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A moving object recognition system comprising:
closed space entry/exit detection means for detecting a moving object entering a closed space and the moving object exiting the closed space, the closed space being formed of detection regions of a sensor configured to detect the moving object and a blind spot region formed outside and between the detection regions;
closed space total amount calculation means for calculating a closed space total amount based on the moving object entering the closed space and the moving object exiting the closed space detected by the closed space entry/exit detection means, the closed space total amount being a total number of moving objects present within the closed space;
region entry/exit detection means for detecting the moving object entering the detection region and the moving object exiting the detection region;
region total amount calculation means for calculating a region total amount based on the moving object entering the detection region and the moving object exiting the detection region detected by the region entry/exit detection means, the region total amount being a total number of the moving objects present within the detection regions; and
blind spot total amount calculation means for calculating a blind spot total amount by subtracting the region total amount calculated by the region total amount calculation means from the closed space total amount calculated by the closed space total amount calculation means, the blind spot total amount being a total number of the moving objects present within the blind spot region.

2. The moving object recognition system according to claim 1, wherein
an entrance of a building is located within the blind spot region,
person detection means for detecting entry of a person from the entrance into the blind spot region and exit of a person from the entrance out of the blind spot region is disposed to the entrance, and
the blind spot total amount calculation means calculates a final blind spot total amount by adding and subtracting a number of persons who have entered and exited the blind spot region detected by the person detection means to and from the result of calculation obtained by subtracting the region total amount calculated by the region total amount calculation means from the closed space total amount calculated by the closed space total amount calculation means.

3. The moving object recognition system according to claim 1, wherein the blind spot total amount calculation means calculates a final blind spot total amount by estimating a number of persons getting in and out of a vehicle present within the blind spot region and adding an estimated number of persons getting out of the vehicle and subtracting an estimated number of persons getting in the vehicle to and from the result of calculation obtained by subtracting the region total amount calculated by the region total amount calculation means from the closed space total amount calculated by the closed space total amount calculation means.

4. The moving object recognition system according to claim 1, further comprising notification means for notifying each moving object entering the detection regions and the blind spot region of the region total amount of each of the detection regions and the blind spot total amount of the blind spot region.

5. A moving object recognition method comprising the steps of:
detecting a moving object entering a closed space and the moving object exiting the closed space, the closed space being formed of detection regions of a sensor configured to detect the moving object and a blind spot region formed outside and between the detection regions;
calculating a closed space total amount based on the moving object entering the closed space and the moving object exiting the closed space, the closed space total amount being a total number of moving objects present within the closed space;
detecting the moving object entering the detection regions and the moving object exiting the detection regions;
calculating a region total amount based on the moving object entering the detection region and the moving object exiting the detection region, the region total amount being a total number of the moving objects present within detection regions; and
calculating a blind spot total amount by subtracting the region total amount from the closed space total amount, the blind spot total amount being a total number of the moving objects present within the blind spot region.

6. A non-transitory computer readable medium storing a program for causing a computer to perform the processes of:
detecting a moving object entering a closed space and the moving object exiting the closed space, the closed space being formed of detection regions of a sensor configured to detect moving objects and a blind spot region formed outside and between the detection regions;
calculating a closed space total amount based on the moving objects entering the closed space and the moving objects exiting the closed space, the closed space total amount being a total number of the moving objects present within the closed space;
detecting the moving objects entering the detection region and the moving object exiting the detection region;
calculating a region total amount based on the moving objects entering the detection region and the moving objects exiting the detection region, the region total amount being a total number of the moving objects present within the detection regions; and
calculating a blind spot total amount by subtracting the region total amount from the closed space total amount, the blind spot total amount being a total number of the moving objects present within the blind spot region.

7. A moving object recognition system comprising:
a closed space entry/exit detector configured to detect a moving object entering a closed space and the moving object exiting the closed space, the closed space being formed of detection regions of a sensor configured to detect the moving object and a blind spot region formed outside and between the detection regions;
a closed space total amount calculator configured to calculate a closed space total amount based on the moving object entering the closed space and the moving object exiting the closed space detected by the closed space entry/exit detector, the closed space total amount being a total number of moving objects present within the closed space;
a region entry/exit detector configured to detect the moving object entering the detection region and the moving object exiting the detection region;
a region total amount calculator configured to calculate a region total amount based on the moving object entering the detection region and the moving object exiting the detection region detected by the region entry/exit detector, the region total amount being a total number of the moving objects present within the detection regions; and
a blind spot total amount calculator configured to calculate a blind spot total amount by subtracting the region total amount calculated by the region total amount calculator from the closed space total amount calculated by the closed space total amount calculator, the blind spot total amount being a total number of the moving objects present within the blind spot region.

* * * * *